United States Patent [19]
Neuberger et al.

[11] Patent Number: 6,138,478
[45] Date of Patent: Oct. 31, 2000

[54] METHOD OF FORMING AN OPTICAL FIBER PREFORM USING AN $E_{020}$ PLASMA FIELD CONFIGURATION

[75] Inventors: Wolfgang Neuberger, F. T. Labuan, Malaysia; Vladimir V. Volodjko; Leonid M. Blinov, both of Moscow, Russian Federation

[73] Assignee: CeramOptec Industries, Inc., East Longmeadow, Mass.

[21] Appl. No.: 09/122,831

[22] Filed: Jul. 27, 1998

Related U.S. Application Data

[63] Continuation-in-part of application No. 08/558,988, Nov. 10, 1995, abandoned, which is a continuation of application No. 08/201,526, Feb. 25, 1994, abandoned, which is a continuation-in-part of application No. 07/948,260, Sep. 21, 1992, abandoned.

[51] Int. Cl.[7] .................................................. C03B 37/018
[52] U.S. Cl. .............................................................. 65/391
[58] Field of Search ................................................. 65/391

[56] References Cited

U.S. PATENT DOCUMENTS

| | | |
|---|---|---|
| Re. 30,635 | 6/1981 | Kuppers . |
| 4,619,680 | 10/1986 | Nourshargh et al. . |
| 4,714,589 | 12/1987 | Auwerda . |
| 4,863,501 | 9/1989 | Mansfield . |
| 4,936,889 | 6/1990 | Greenham et al. . |
| 4,944,244 | 7/1990 | Moisan et al. . |
| 5,133,794 | 7/1992 | Bachmann . |
| 5,211,731 | 5/1993 | Busse . |
| 5,320,659 | 6/1994 | Ishiguro . |

*Primary Examiner*—John Hoffmann
*Attorney, Agent, or Firm*—B J Associates; Bolesh J Skutnik

[57] ABSTRACT

The present invention is directed at a method and device for manufacturing a preform. The method involves arranging a starting body within a channel as defined by a vessel. Then, the channel is supplied with a reactive gas containing a coating material precursor. A resonator then generates a plasma zone within the channel. The starting body is aligned in the channel such that the plasma zone concentrically surrounds the starting body. The axial movement of the resonator relative to the starting body is controlled such that a desired layer of coating material precursor reactively deposits on the starting body to form the preform. The method suppresses deposition on the inside of the vessel via suppressing means, which may involve inducing nodes in the E-field at the vessel walls, or using an suppressing gas on the inner surface of the vessel, or a combination of the two. The present invention is also directed at a device to facilitate the aforementioned method.

12 Claims, 4 Drawing Sheets

METHOD OF FORMING AN OPTICAL FIBER PREFORM USING AN $E_{020}$ PLASMA FIELD CONFIGURATION

REFERENCE TO RELATED CASE

This application is a continuation-in-part of copending U.S. patent application Ser. No. 08/558,988 filed on Nov. 10, 1995 by W. Neuberger, V. V. Volodjko, L. M. Blinov, inventors, entitled "Process and Equipment for Manufacturing Glassbodies for the Manufacturing of Optical Fiber" abandoned; which in turn was a continuation of U.S. patent application Ser. No. 08/201,526 filed on Feb. 25, 1994, now abandoned; which was a continuation-in-part of U.S. patent application Ser. No. 07/948,260 filed on Sep. 21, 1992, now abandoned, and incorporated by reference herein.

BACKGROUND OF THE INVENTION

1. Field of the Invention

The present invention relates generally to a process for manufacturing preforms used in optical fibers, and more specifically to manufacturing preforms by outside reactive deposition.

2. Information Disclosure Statement

The prior art regarding reactive deposition essentially centers around two methods: inside reactive deposition and outside reactive deposition. Several patents disclose methods for the inside coating of a core material For example, Greenham et al., U.S. Pat. No. 4,936,889, Moisan et al., U.S. Pat. No. 4,944,244, Auwerda U.S. Pat. No. 4,714,589, Nourshargh U.S. Pat. No. 4,619,680, and European Patent DE-PS 24 44 100 are exclusively concerned with inside deposition methods. Additionally, European Patent DE-OS36 32 684 discloses a resonator design useful for performing an inside reactive deposition.

The inside reactive deposition process involves generating a plasma zone inside a tube, and axially moving the tube relative to the plasma generating equipment. The reactive deposition is performed in a pressure range of 1 to 10 Torr, and a temperature zone is superimposed over the plasma zone. Because the reaction chamber is small, this process provides good control of the reactive gas and maintains a clean depositing environment.

The product obtained from the process is a preform which is used to draw an optical fiber. For data communication applications, the light conducting core of the fiber is usually small in comparison with the outside diameter of the fiber. The process of inside deposition (as described by the above mentioned patents) is suitable for this application.

Other applications such as laser delivery or sensing systems, however, require fibers with a large, usually undoped core and a relatively thin, mostly fluorine doped cladding. For these applications, it is preferred to start the manufacturing process from an undoped, commercially available quartz glass rod of high purity and to deposit only a relatively thin doped layer on its outside. The inside deposition method on the other hand requires a high quantity of material to be deposited in this case because the core area is large. Consequently, this method consumes a large part of the gas mixture.

The manufacturing of preforms with high core to clad ratios is usually performed starting from undoped quartz rods. These rods are then coated on the outside with a doped quartz layer by means of atmospheric plasma burners. This process suffers from several shortcomings such as environmental contamination and the elaborate measures required to maintain purity of the deposited substance in the open atmosphere. Consequently, the atmospheric plasma burner yields much lower reagent disassociation and deposition efficiencies of silica. For example, Mansfield, U.S. Pat. No. 4,863,501 describes an atmospheric plasma burner depositing soot, not fused silica.

One method that avoids a plasma burner is described in AJIG (DE 3331899 A1). That patent describes a method for the reactive deposition on a glass-body. More specifically, it describes a method for the production of preforms where the essential advantage claimed is the absence of moving parts. This is achieved by inserting a rod in the center of a discharge tube and filing the tubes with gas. Next, a theta pinch plasma reaction is initialized to compress the ionized gas particles towards the rods surface where layers are successively deposited.

This process, however, has several shortcomings. A major disadvantage of this method is a build-up on the inside of the tube and not the rod. This results because the inductive discharge produces maximum field strength on the inside of the tube. Additionally, the extremely strong ionization that would be required to produce the radial compression toward the rod would inhibit the chemical process necessary for effective deposition. Finally, the high field strength required would make a continuous process impractical and perhaps impossible.

Therefore, a need exists to deposit layers on the outside of a glass-body, to maintain high gas efficiencies, to avoid contaminating layers, to minimize build up on the inside of the device, and to provide for possible continuous processing. The present invention fulfills these needs. SUMMARY OF THE INVENTION The present invention is directed at an improved method for reactive deposition in the production of preforms. It is a particular object of the invention to deposit layers on the outside of a starting body while maintaining high gas efficiencies, avoiding contamination of the layers, and allowing for a continuous process. This is accomplished by using a wave type resonator in a controlled atmosphere. The resonator in the present invention avoids the extra consolidation stage necessary in the Mansfield patent because the system works at low pressures (several Torr) and the resonator produces a much higher field intensity (E) than a burner as described in the Mansfield patent. Since deposition efficiency strongly increases with field intensity (E), the present invention promotes higher deposition rates of fused silica glass.

It is another object of the invention to deposit on the outside of a starting body while suppressing deposition on the inside walls of the tube. The invention achieves this object by achieving a maximum field strength in the region of the starting body and a node in the field strength near the tube. Since the deposition relates to field strength, the layers would tend to form on the starting body rather than the inside of the device. Alternatively or in combination, the present invention maintains a radial protective gas flow through (a porous) tube which buffers the inner wall from the reactive gas.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, the several figures in which like reference numerals identify like elements and in which:

DETAILED DESCRIPTION OF PREFERRED EMBODIMENTS

The prime feature of the experimental devices and procedures, described below, is providing means for suppressing deposition on inside walls of a deposition chamber while achieving a highly efficient deposition on the surface of the starting body. In one preferred embodiment this involves having a way to produce and isolate a specific wave structure in the resonator cavity so that the electric field intensity is at its highest value near the surface of glass-body on which deposition is desired, while simultaneously the electric field intensity has a node, i.e. a zero value, at the inside walls of the cavity. The plasma is strongest where the electric field strength is greatest and thus the deposition is most favored there as well.

A key to achieving such an electric field intensity distribution has been found by isolating a specific electromagnetic wave type within the resonator/deposition chamber, having the form $E_{020}$, using polar coordinates $[z,r,\phi]$ to describe the cylindrical symmetry of the resonator/deposition chamber There are at least three ways to achieve this:

a. resonator geometry such that the desired $E_{020}$ wave is stable within the resonator chamber while other waves are unstable due to deconstructive addition from reflections within the chamber;

b. geometry of the entrance for the microwaves into the resonator chamber, which can interfere with non-selected wavelengths as they enter the chamber; and c. specialty microwave filters introduced to the resonator chamber at some distance outside of the chamber center, where the starting body and inner wall are positioned.

In one alternative embodiment described below, the suppression of deposition along the inner wall surrounding the starting body is achieved by providing a protective gas flow over and through the inner wall. To achieve highly efficient deposition on the starting body surface, though, the microwave initiated plasma should still have a maximum in its wave amplitude near the surface of the starting body.

Figure 1:
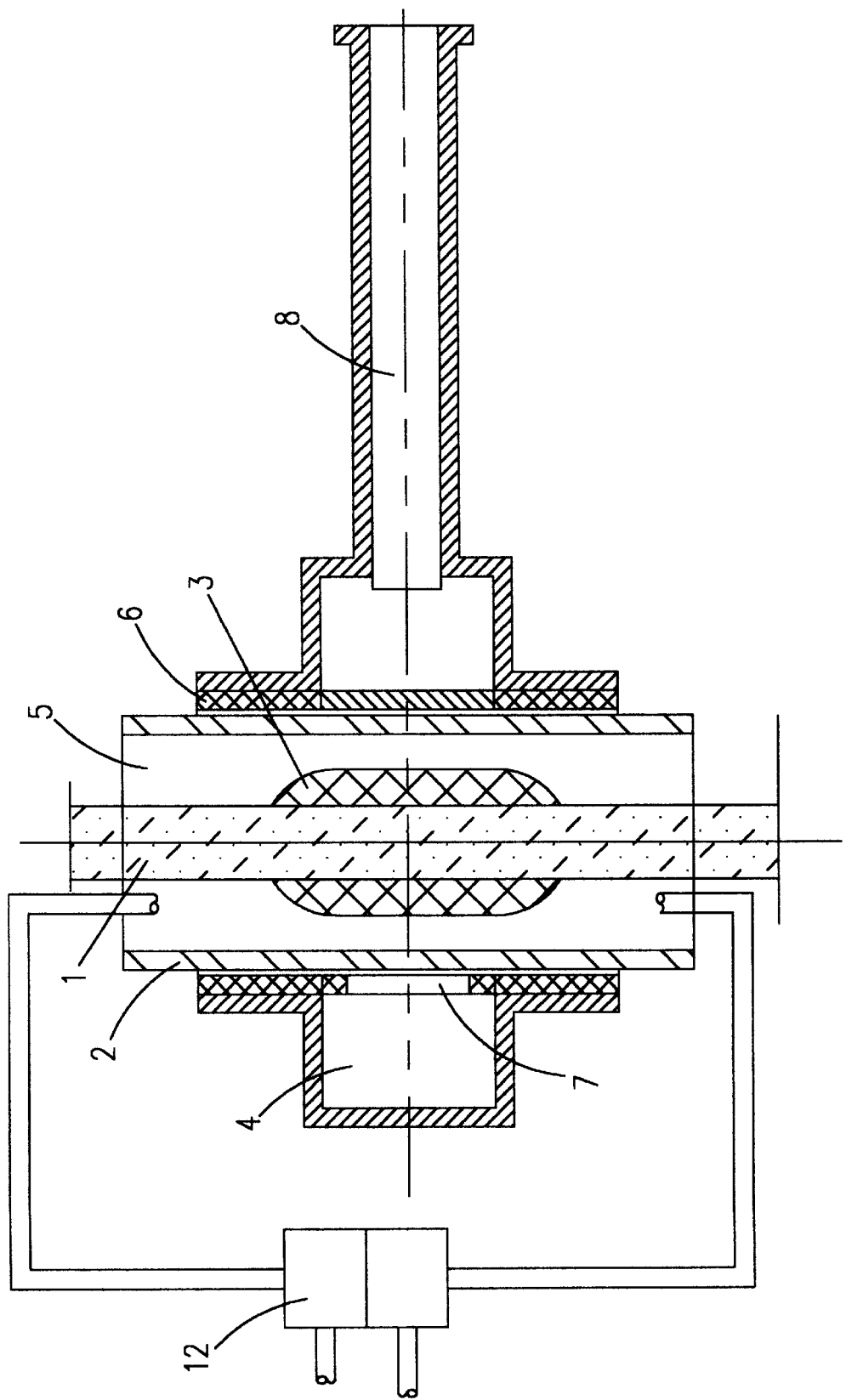
FIG. 1 shows a longitudinal cut through a device for manufacturing outside coated glass rods or glass tubes for the manufacturing of optical fiber by means of a plasma generator.
Figure 2:
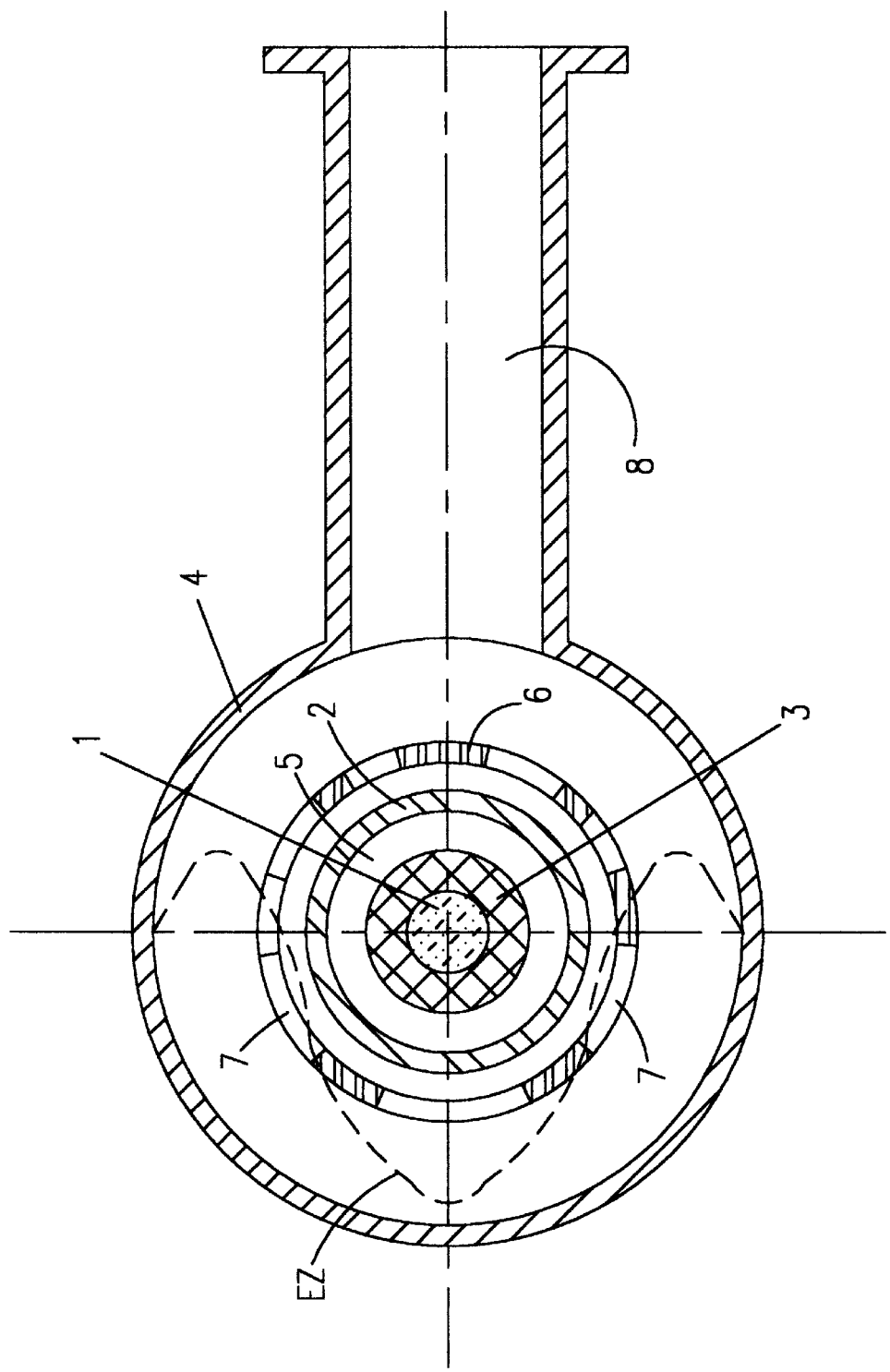
FIG. 2 shows the cross section of the same device.

A device for performing the process of manufacturing outside coated glass-bodies is shown in FIGS. 1 and 2. In one preferred form, the device comprises a vessel 2 which defines a channel 5. Channel 5 is adapted to receive a cylindrical, starting body 1 and a reactive gas.

Starting body 1 is composed of a dielectric material, and has several preferred embodiments. For example, it could be shaped as a rod or tube, and could be comprised of undoped quartz glass, doped quartz glass, or ceramic.

The reactive gas surrounds starting body 1 and has current I and pressure P1. The reactive gas contains a coating material precursor. Reactive deposition causes the coating material precursor to react and deposit out of the reactive gas, thereby changing the reactive gas to a spent gas.

A reactive gas supply means 12 supplies channel 5 with the reactive gas, and evacuates the spent gas. Reactive gas supply means may be fashioned after any gas supply/exhaust means known in the art. Such devices traditionally comprise either a positive pressure or vacuum pump, filters, reactors, connectors, and control devices.

A resonator 4 generates a plasma zone 3 within channel 5 which concentrically envelopes starting body 1. Plasma zone 3 facilitates the reactive deposition of the coating material precursor on starting body 1. Suitable windows 7 on resonator 4 provides homogeneous field strength distribution. Radiation of the plasma to the outside is limited by means of a barrier wall 6 that surrounds vessel 2.

Wave energy supply means 8 supplies resonator 4 with wave energy, and is well known in the art. In the preferred embodiment shown in FIG. 1, the wave energy supply means comprises a hollow waveguide to supply microwave energy to resonator 4.

Figure 3:
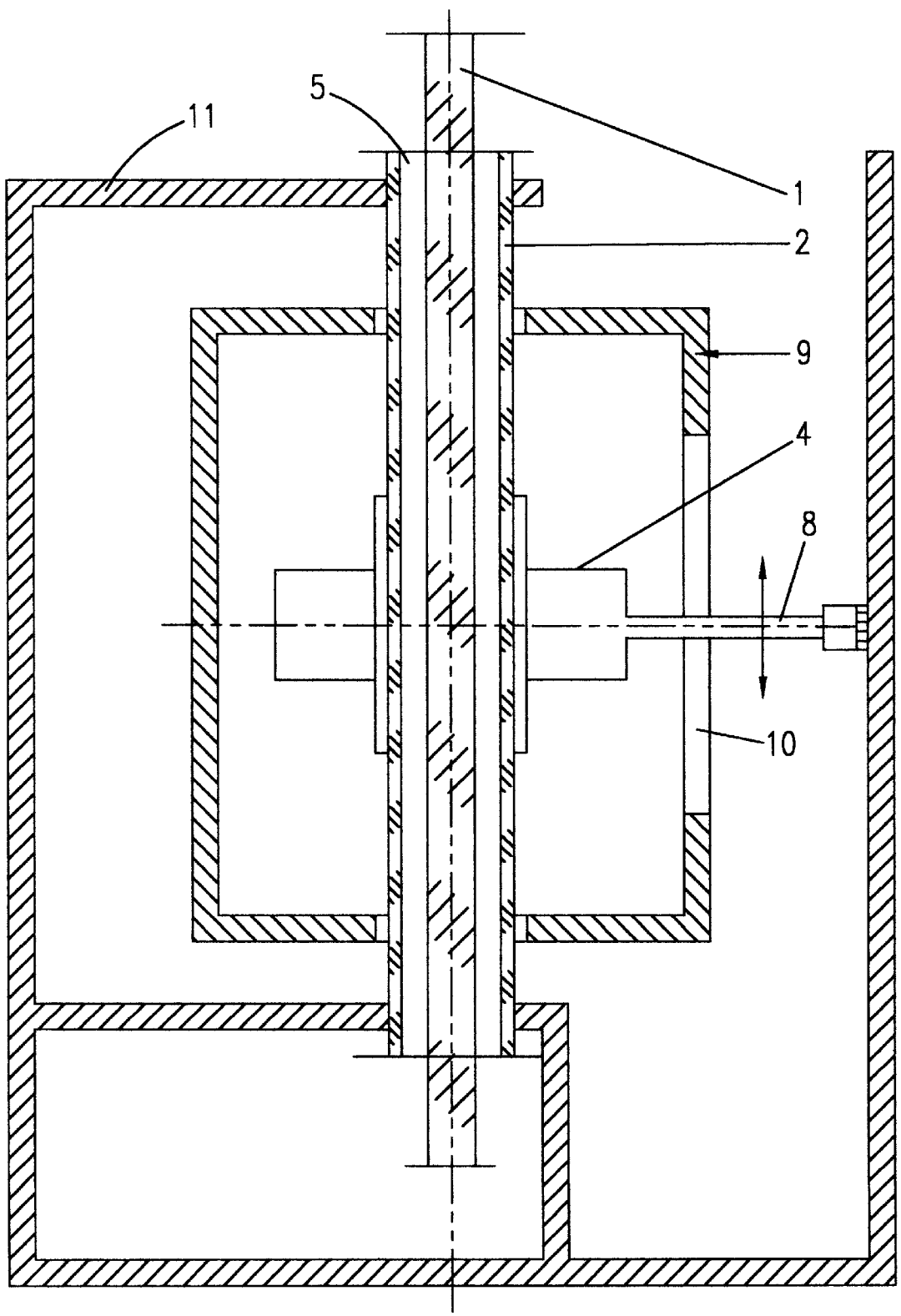
FIG. 3 gives an overview of the device inside a furnace.

FIG. 3 depicts a schematic of the total assembly. Here, starting body 1, vessel 2, and resonator 4 are positioned inside furnace 9, and are connected by connecting means 11. Connecting means 11 connects vessel 2 and resonator 4 such that they can move axially in relation to one another. For example, vessel 2 may remain stationary while resonator 4 moves. In either case, connecting means 11 allows resonator 4 to apply a desired level of coating to starting body 1. A slit 10 in furnace 9 allows resonator 4 together with hollow waveguide 8 to move along starting body 1. The device is not dependent upon gravity, and consequently, can have horizontal, vertical or inclined orientation. A vertical arrangement, however, may be preferred to avoid bending problems due to gravity when starting body 1 is heated.

Deposition of the gas on the inside of vessel 2 is limited by suppressing means. Suppressing means comprises several different embodiments. For example, resonator 4 can be chosen to isolate $E_{020}$ as a standing wave within it. In general electrodynamics theory, $E_{lmn}$ means the electric field intensity distribution along the cylindrical space coordinates z, r, $\phi$. The zeros in the classification indicate a homogeneous field at that particular coordinate (no zero point transitions). From $E_{020}$ therefore corresponds to an electric field that has a radial distribution such that the field strength is at a node value on the inside of vessel 2 and maximized near the outside of starting body 1. This is indicated in FIG. 2 where the field distribution curve EZ of the E-field of resonator 4 is shown as a dashed line. Since reactive deposition relates to the field strength of resonator 4, deposition will occur mostly at the surface of starting body 1 and minimally at the inside of vessel 2.

As an illustrative example, referring to FIGS. 1–3, the deposition conditions to deposit a fluorosilicate cladding over a pure silica core starting body is presented. A 2.5 kilowatt microwave source operating at 2.45 GHz generates microwaves which enter wave energy supply means 8 and are guided into resonator 4. Reactive gas supply means 12 supplies channel 5 with a mixture of oxygen, silicon tetrachloride, and perfluoroethane approximately in the ratio of 133 to 20 to 1, respectively, to yield a pressure of 4.8 mbar within channel 5. Starting body 1 is a pure silica rod having a diameter of 24 mm and channel 5 has a diameter of 46 mm. This combination works well to isolate the $E_{020}$ field within channel 5 and to have the maximum field energy near the surface of the pure silica rod. The cladding deposition is allowed to proceed until the diameter of starting body 1 is increased to about 26.4 mm. Because of the relatively small change in diameter of starting body 1 during the deposition the maximum field strength of $E_{020}$ remains near the surface of the silica rod. Furnace 9 surrounds resonator 4 and starting body 1 and is set at about 1120° C. to cause the newly deposited material to consolidate onto starting body 1. The final product is a composite silica rod called a preform which is used as the starting point for the production of optical fibers for various photonic applications, including laser surgery, sensing, spectrophotometry and optical metrology.

Figure 4:
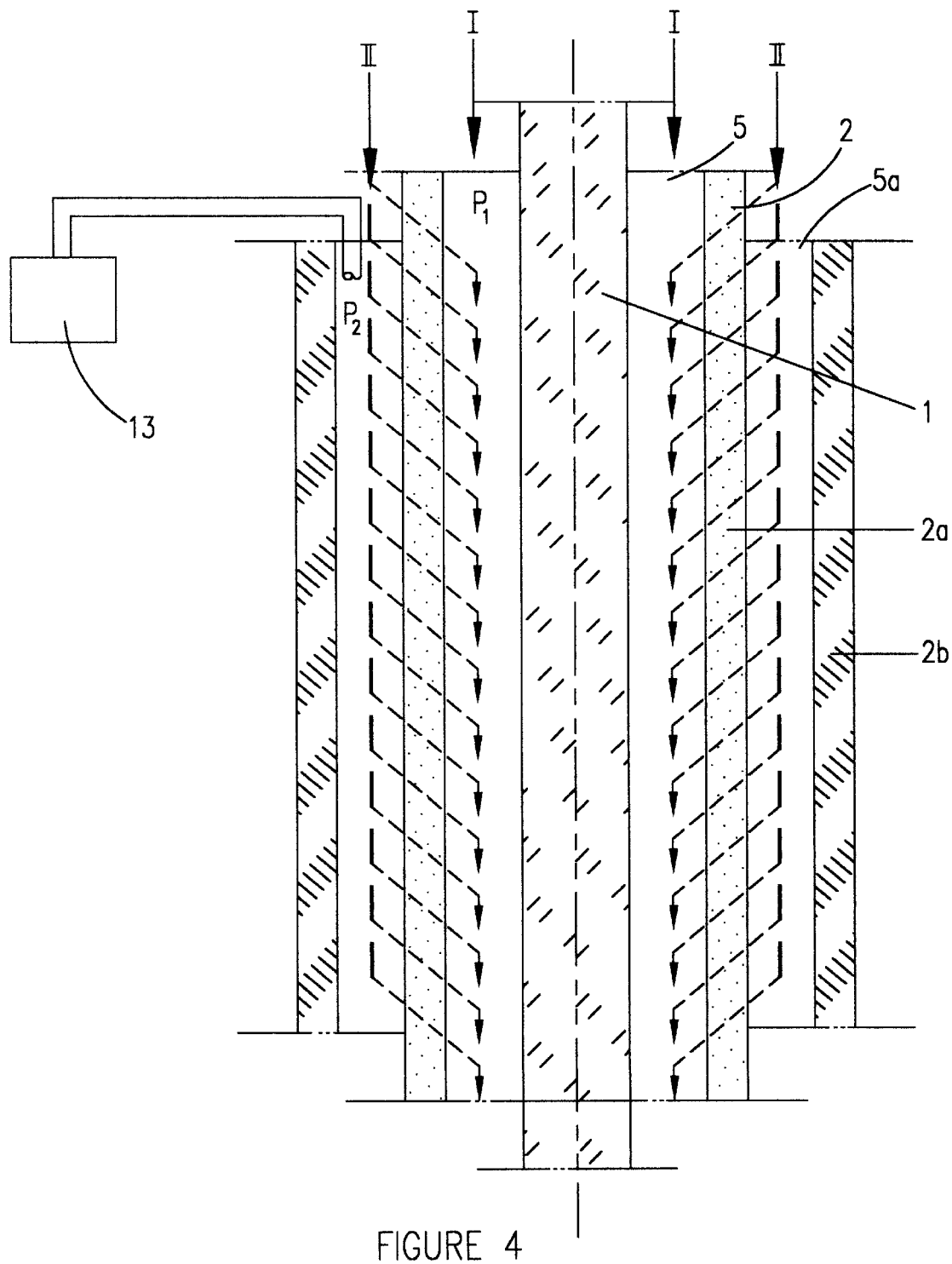
FIG. 4 shows details of another preferred embodiment.

FIG. 4 shows another preferred embodiment of the invention's suppressing means. Here, vessel 2 comprises two concentric walls, an outer wall 2b and a gas permeable inner wall 2a. Outer wall 2b and inner wall 2a form an annular volume 5a. Annular volume 5a is adapted to receive a suppressing gas with a pressure P2 which is higher than pressure P1 of the reactive gas in channel 5. In one preferred embodiment, suppressing gas consists of Oxygen. By maintaining a suitable positive pressure difference (P2–P1) across inner wall 2a, the suppressing gas flows from annular volume 2b to channel 5 just inside inner wall 2a. This suppressing gas layer prohibits the deposition of coating material on the inside of vessel 2 in a gas-dynamic manner. The material comprising inner wall 2a is suitably chosen to be a water-free dielectric like quartz glass or ceramics.

FIG. 4 shows an suppressing gas supply means 13 which supplies annular volume 5a with the suppressing gas, and if needed, evacuates annular volume 5b. Suppressing gas supply means 13 may be fashioned after any gas supply/ exhaust means known in the art. Such devices traditionally comprise either a positive pressure or vacuum pump, filters, reactors, connectors, and control devices.

The process of reactive deposition is achieved by filing channel 5 with the reactive gas and surrounding starting body 1. Resonator 4 generates plasma zone 3 within channel 5 on the surface of starting body 1. Starting body 1 should be aligned such that plasma zone 3 concentrically envelopes it. This allows preforms with a large core to clad ratio to be manufactured in a controlled atmosphere with a good efficiency of gas usage and high quality. These conditions insure the preforms' usefulness in optical fiber production. The results are particularly good if the reactive deposition of the coating material precursor is performed using a pressure range of one to twelve Torr and a temperature zone is superimposed on the plasma zone.

Deposition of the coating material on the inside of vessel 2 is suppressed by keeping the field-strength of resonator 4 at the inside of the vessel at a low level and/or maintaining a suppressing gas-layer at the inside surface of vessel 2.

In a preferred embodiment of the invention, fluorine and/or boron doped $SiO_2$ is deposited on the outside surface of a pure $SiO_2$ starting body 1. The concentration of at least one dopant(fluorine or boron) could be maintained constant over an essential part of the deposited layer, or it could be continuously increased or decreased as the layer thickens. The described process can also be used in the manufacture of graded index fibers. To this end, the refractive index of successively deposited layers is continuously decreased towards the outside of the preform.

Once the preform is manufactured, it may be desirous to remove starting body 1 before drawing of an optical fiber. This removal could be accomplished by cracking out starting body 1, or by drilling out starting body 1. Removing starting body 1 leaves a hollow preform which may need to be collapsed before drawing into optical fiber. To collapse the preform, a glass lathe and a hydrogen-oxygen burner name could be used.

Having described preferred embodiments of the invention with reference to the accompanying drawings, it is to be understood that the invention is not limited to these precise embodiments, and that various changes and modifications may be effected therein by one skilled in the art without departing from the scope or spirit of the invention as defined in the appended claims.

What is claimed is:

1. A method for manufacturing a preform comprising the steps of:
   a. arranging a dielectric starting body within a tubular vessel, said vessel defines a channel, wherein said tubular vessel has two concentric walls restricting an annular volume;
   b. supplying said channel with a reactive gas containing a coating material precursor;
   c. generating a plasma zone in said channel via a resonator;
   d. aligning said starting body in said vessel such that said plasma zone concentrically envelopes said starting body;
   e. controlling axial movement of said resonator relative to, said starting body such that a desired layer of coating material reactively deposits on said starting body to form said preform;
   f. employing a step for suppressing deposition on inside surfaces of said vessel, which further comprises:
      $f_1$. permeating a suppressing gas through an inner wall surface of said tubular vessel; and
      $f_2$. configuring said resonator in such a way as to generate only an $E_{020}$ field configuration whose E-field is equal to zero on said vessel's inside walls and whose E-field reaches its maximum value on said starting body's periphery.

2. The method according to claim 1 wherein said suppressing gas comprises oxygen.

3. The method according to claim 1, wherein supplying said channel with said reactive gas further comprises maintaining a pressure range of 1 to 12 Torr in said channel.

4. A method for manufacturing a preform comprising the steps of:
   a. arranging a dielectric starting body within a tubular vessel, said vessel defines a channel, wherein said tubular vessel has two concentric walls restricting an annular volume,
   b. supplying said channel with a reactive gas containing a coating material precursor;
   c. generating a plasma zone in said channel via a resonator;
   d. aligning said starting body in said vessel such that said plasma zone concentrically envelopes said starting body;
   e. controlling axial movement of said resonator relative to said starting body such that a desired layer of coating material reactively deposits on said starting body to form said preform;
   f. employing a step for suppressing deposition on inside surfaces of said vessel wherein said step for suppressing deposition on inside surfaces of said vessel is:
      $f_1$. configuring said resonator in such a way as to generate only an $E_{020}$ field configuration, whose E-field is equal to zero on said vessel's inside walls and whose E-field reaches its maximum value on said starting body's periphery.

5. The method according to claim 4 wherein said dielectric starting body is selected from the group consisting of doped quartz glass, undoped quartz glass and ceramics.

6. The method according to claim 5 further comprising the steps of:
   g. removing said starting body from said preform thereby leaving a hollow preform; and
   h. collapsing said hollow preform.

7. The method according to claim 6 wherein said collapsing comprises the steps of heating said preform on a glass lathe and applying a hydro-oxygen burner flame to said preform.

8. The method according to claim 4 wherein said coating material deposited on said periphery of said starting body contains a dopant selected from the group consisting of fluorine and boron.

9. The method according to claim 8 wherein a constant concentration of said dopant in coating material s maintained while said coating material reactively deposits on said starting body.

10. The method according to claim 8 wherein the concentration of dopant in said coating material is continuously increased while said coating material reactively deposits on said starting body thereby creating a greater concentration of dopant on the outside of said deposited layer.

11. The method according to claim 4, wherein supplying said channel with said reactive gas further comprises maintaining a pressure range of 1 to 12 Torr in said channel.

12. The method according to claim 4 wherein said method comprises the further step of superimposing a higher than ambient temperature zone on said plasma zone.

* * * * *